United States Patent [19]

Queneau et al.

[11] 4,311,679

[45] Jan. 19, 1982

[54] TREATMENT OF SODIUM TUNGSTATE LEACH LIQUOR CONTAINING DISSOLVED SILICA, PHOSPHORUS, AND FLUORINE IMPURITIES

[75] Inventors: Paul B. Queneau, Golden; Leo W. Beckstead, Arvada; Dale K. Huggins, Golden, all of Colo.

[73] Assignee: Amax Inc., Greenwich, Conn.

[21] Appl. No.: 225,907

[22] Filed: Jan. 19, 1981

[51] Int. Cl.$^3$ .............................................. C01G 41/00
[52] U.S. Cl. ...................................... 423/55; 423/53; 423/54; 423/61
[58] Field of Search ...................... 423/53, 55, 58, 61, 423/54

[56] References Cited
U.S. PATENT DOCUMENTS 1,399,705  12/1921  Eheeley et al. .................. 423/58
4,092,400  5/1978   Zbranek et al. ................. 423/54
4,115,513  9/1978   Kulkarni et al. ................ 423/55

FOREIGN PATENT DOCUMENTS 456789  2/1975  U.S.S.R. ............................. 423/55

OTHER PUBLICATIONS

Betz et al., Ind. and Eng. Chem., vol. 32, (Oct. 1940), pp. 1320–1323.
Betz et al., Ind. and Eng. Chem., vol. 32, (Oct. 1940), pp. 1323–1329.
Betz et al., Ind. and Eng. Chem., vol. 33, (Jun. 1941), pp. 814–820.
Betz et al., Trans. ASME, vol. 63, (Nov. 1941), pp. 713–720.
Meyer et al., Ind. and Eng. Chem., vol. 36, (May 1944), pp. 420–422.
Lindsay et al., Ind. and Eng. Chem., vol. 31, (Jul. 1939), pp. 859–861.
Straub, Ind. and Eng. Chem., vol. 28, (Jan. 1936), pp. 36–37.
Greenberg et al., J. Phys. Chem., vol. 61, (Nov. 1957), pp. 1539–1541.
Yih & Wang, Tungsten: Sources, Metallurgy, Properties and Applications (1979), p. 103.

Primary Examiner—Herbert T. Carter
Attorney, Agent, or Firm—Michael A. Ciomek; Donald T. Black

[57] ABSTRACT

Basic sodium tungstate leach liquor is treated to reduce the concentration dissolved therein of silica, phosphorus and fluorine impurities in a process which comprises providing a small but effective amount of magnesium in the liquor to maximize removal of silica and phosphorus from solution in the liquor while maintaining the liquor temperature between about 60° C. and about 100° C. and the liquor pH between about 9 and about 11, filtering the liquor, adjusting the liquor pH to between about 6 and about 8 and the liquor temperature to between about 20° C. and about 60° C., and then providing a small but effective amount of aluminum hydroxide in the filtered liquor to maximize removal of fluorine from solution in the liquor while maintaining the liquor temperature between about 20° C. and about 60° C. and the liquor pH between about 6 and about 8.

8 Claims, No Drawings

TREATMENT OF SODIUM TUNGSTATE LEACH LIQUOR CONTAINING DISSOLVED SILICA, PHOSPHORUS, AND FLUORINE IMPURITIES

BACKGROUND OF THE INVENTION

1. Field of the Invention

The present invention relates to the recovery of tungsten from tungsten-bearing ore, and relates in particular to processes in which tungsten-bearing ore is leached to form an aqueous sodium tungstate leach liquor which is treated for recovery of a tungsten-bearing final product such as ammonium paratungstate (APT). More particularly, the present invention relates to reducing the concentration of silica, phosphorus, and fluorine impurities dissolved in sodium tungstate liquor.

A sodium tungstate leach liquor is typically produced by the reaction of ore concentrates in water with, for instance, soda ash to dissolve the tungstate values. The concentrates usually contain impurities which are also dissolved in the leaching reaction. These impurities should be removed from the liquor to as high a degree as possible because they can interfere with subsequent processing steps. Silica interferes with solvent extraction of the leach liquor, and it can contaminate the final tungsten product. Phosphorus and fluorine can interfere with the removal of molybdenum impurities, and can also contaminate the final product. In addition, in some liquor treatment stages reagents are added which contribute minor amounts of impurities that can be tolerated if the concentrations of those impurities in the leach liquor have previously been reduced.

In particular, the leach liquor can contain in solution excessive amounts of silica, phosphorus, and fluorine impurities which should be rejected from solution. By "silica" is meant $SiO_2$ as well as other silicon-based dissolved impurities including $Si(OH)_n$ and $SiO_3^{-2}$. By "phosphorus" is meant dissolved phosphorus-based compounds including orthophophates and metaphosphates. By "fluorine" is meant $F^-$ ion as well as other dissolved fluorine-based impurities including $SiF_6^{-2}$.

There is a need for a process for rejecting these dissolved impurities from sodium tungstate leach liquor which is effective in a short period of time, and which makes efficient use of reagents and equipment.

This need is particularly acute in the treatment of liquors obtained by high-temperature autoclave leaching of tungsten ores, such as leaching carried out at 200° C. to 240° C. In addition, in some instances the sodium tungstate leach liquor will contain acceptably small or minimal amounts of dissolved silica along with unacceptably high amounts of dissolved phosphorus and fluorine; this condition could arise through leaching the tungsten ore under conditions which minimize the solution of silica, or because of the characteristics of the ore. Thus, a process for rejecting dissolved impurities from sodium tungstate leach liquor is needed which is flexible enough to be effective and economical in treating such leach liquors low in dissolved silica as well as sodium tungstate leach liquors that contain excessive amounts of dissolved silica.

2. Description of the Prior Art

While there have been efforts in the past to reduce the concentration of dissolved substances from aqueous systems, these efforts do not suggest the particular conditions of the present invention for rejecting silica, and the other impurities described above, from basic sodium tungstate leach liquors.

The prior art has recognized the usefulness of magnesium and aluminum compounds in precipitating silica from water (generally from relatively solute-free water), but the art does not suggest the particular process of the present invention. Specifically, Betz, Noll, and Maguire in *Ind. and Eng. Chem.*, Vol. 32, pp. 1320-23 (October 1940) reported that adding aluminum hydroxide to water containing about 20 ppm of dissolved silica rejected silica from solution within a one-hour period, and that rejection is generally favored at lower temperatures within the range 20° C. to 95° C. and specifically at 23° C. Most favorable rejection of silica occurred at a pH of 8.3 to 9.1, but operation at a pH of 7.6 to 8.0 was recommended to avoid dissolving excessive amounts of aluminum. The same authors in *Ind. and Eng. Chem.*, Vol. 32, pp. 1323-29 (October 1940) reported that adding MgO to solutions containing about 22 ppm of dissolved silica rejected silica from solution within about 15 minutes at a pH of 9.7 to 10.6, and that rejection is favored at higher temperatures in the range 30° C. to 95° C. and specifically at 95° C.

U.S. Pat. No. 4,092,400 describes a process for rejecting silica from a sodium tungstate leach liquor. The pH of the liquor is adjusted to between about 8 to 11, and the temperature of the liquor is maintained at about 20° C. to about 30° C. An aluminum or magnesium salt which will form a silica-containing precipitate is then added to the liquor. Compounds specifically said to be useful are aluminum sulfate and sodium aluminate. The patentees state that the precipitation should take about one hour, but can take up to 4 to 6 hours.

Another process comprises adding both 0.08 kg of aluminum sulfate per kg of $WO_3$ and 0.03 kg of magnesium sulfate per kg of $WO_3$ to the slurry that is recovered from the tungstate leach reactor, prior to filtration of unleached solids, at a liquor pH of 9 to 9.5 and a temperature of 70° C. to 80° C. This slurry is stirred for 1 hour, solids are filtered off, and then both aluminum sulfate and magnesium sulfate are again added to the filtered liquor in amounts of 0.08 kg aluminum sulfate per kg of $WO_3$ and 0.03 kg of magnesium sulfate per kg of $WO_3$, at a liquor pH of 9 to 9.5 and a temperature of 70° C. to 80° C., to form a precipitate which is filtered off. A drawback of this process is that adding aluminum at a pH such as about 9 to 9.5 to a liquor containing appreciable amounts of fluorine impurities can lead to the formation of an aluminum-fluorine complex which is then removed from solution only with great difficulty.

SUMMARY OF THE INVENTION

The present invention achieves the objects stated above and other objects as follows. The invention comprises a process for treating a filtered or unfiltered basic sodium tungstate leach liquor to reduce the concentration dissolved therein of silica, phosphorus and fluorine impurities, comprising providing a small but effective amount of magnesium in the liquor to maximize removal of silica and phosphorus from solution in the liquor while maintaining the liquor temperature between about 60° C. and about 100° C. and the liquor pH between about 9 and about 11, filtering the liquor, adjusting the liquor pH to between about 6 and about 8 and the liquor temperature to between about 20° C. and about 60° C., and then providing a small but effective amount of aluminum hydroxide in the filtered liquor to maximize removal of fluorine from solution in the liquor while maintaining the liquor temperature between about 20° C. and about 60° C. and the liquor pH between about 6 and about 8.

DETAILED DESCRIPTION OF THE INVENTION

The present invention is useful for the treatment of aqueous sodium tungstate solutions containing undesired amounts of silica, phosphorus, and fluorine dissolved therein, for the removal of those dissolved impurities. Moreover, the present invention is particularly applicable to the rejection of such impurities from leach liquor which is formed in the alkali digestion of tungsten-bearing ore, wherein these impurities are dissolved in the liquor in amounts which interfere with processing of the liquor for recovery of an acceptably pure tungsten-containing product. Following treatment of the leach liquor in accordance with the present invention, the liquor can be passed to optional additional impurity removal stages. The liquor is then sent through a solvent extraction stage, in which tungsten values are extracted from the leach liquor into an ammoniacal organic phase and then stripped from the organic phase into an ammoniacal aqueous phase. The product, a purified solution of ammonium tungstate, can then be processed for recovery of solid APT.

Sodium tungstate leach liquor that is treated in accordance with the present invention typically contains about 50 gpl to about 150 gpl tungsten as $WO_3$, as well as about 20 to about 10,000 ppm of dissolved silica, about 10 to about 120 ppm of dissolved phosphorus, and about 500 to about 4000 ppm of dissolved fluorine.

Sodium tungstate leach liquor that can be treated by the process of the present invention includes leach liquor produced by the processes described in the following patent applications, filed on even date herewith, which are assigned to the assignee of the present application: "Combined Autoclave Soda Digestion of Wolframite and Scheelite", Ser. No. 225,905; "Autoclave Soda Digestion of Scheelite On-Line Feedback Control", Ser. No. 225,910; "Autoclave Soda Digestion of Refractory Concentrates", Ser. No. 225,913; and "Autoclave Soda Digestion of Scheelite Concentrates", Ser. No. 225,914. The disclosures of these applications are hereby incorporated by reference herein.

In the treatment of the leach liquor in accordance with the present invention to remove dissolved silica, phosphorus and fluorine, the leach liquor is first brought to a temperature between about 60° C. and about 100° C. The liquor pH is adjusted, if necessary, with suitable additions of sulfuric acid or sodium hydroxide as required, to about 9 to about 11 for effective removal of impurities. The leach liquor can be treated directly as it is recovered from the leach reactor, in which case it will generally already have a temperature of about 60° C. to about 100° C. and will be slurried with unreacted solids and gangue. The leach liquor can be filtered from the slurry at this point, but it is not necessary to filter solids from the liquor prior to treatment according to this invention. Thus, the process of the present invention can be used to remove impurities from a filtered leach liquor or from a slurry comprising sodium tungstate leach liquor slurried with unreacted solids and gangue.

Magnesium is then added to the leach liquor in an amount effective to remove dissolved silica and phosphorus from solution in the liquor. Silica removal by this method reduces the concentration of these impurities and also enhances the removal of fluorine impurities by the steps set forth below. Preferred sources of magnesium are those compounds such as magnesium sulfate ($MgSO_4$) which leave an anion (e.g. sulfate ion) in the leach liquor that can be easily and economically removed in subsequent processing steps. Alternatively, magnesium chloride or magnesium hydroxide can be added. If a water-insoluble magnesium compound is used, it should advantageously be in a freshly precipitated form.

While the mechanism through which silica and phosphorus impurities are removed from solution is not clear, the magnesium is believed to act through formation of insoluble precipitates of magnesium phosphate, magnesium silicates, and magnesium carbonate, and by adsorption of the silica impurities on the precipitates. The present invention is not limited to a particular mechanism, however. Accordingly, the pH of the liquor in this step of the invention should be adjusted to minimize the solubility of silica and phosphorus impurities in the sodium tungstate liquor. In this regard, a pH of about 9 to about 11, and more advantageously about 10 to about 11, should be provided. Likewise, the amount of magnesium provided in the liquor should be effective to minimize the silica and phosphorus remaining in solution in the liquor. While the amount of magnesium can vary with the impurity content in the liquor, an amount of a magnesium compound corresponding to about 0.1 gpl to about 3.0 gpl of magnesium ion, and more advantageously about 0.5 gpl to about 2.0 gpl of magnesium ion, is generally effective.

The liquor is filtered and is then brought to a temperature between about 20° C. and about 60° C., and the pH is adjusted to about 6 to about 8 for effective removal of impurities. The pH can be adjusted by suitable addition of, for example, sulfuric acid. Following adjustment of the liquor pH and temperature, aluminum hydroxide is provided in the liquor in an amount effective to maximize the removal from the liquor of the remaining dissolved fluorine impurities. Aluminum hydroxide can be provided to the liquor by adding freshly precipitated aluminum hydroxide per se to the liquor, or by adding another aluminum compound which forms aluminum hydroxide in situ in the liquor. Preferred aluminum compounds are those salts such as aluminum sulfate ($Al_2(SO_4)_3$) which leave an anion (e.g. sulfate ion) in the leach liquor that can be easily and economically removed in subsequent processing steps. Other advantageous aluminum compounds that can be used are aluminum chloride, alumina, and aluminates such as sodium aluminate.

The mechanism through which the aluminum hydroxide acts to remove fluorine impurities is believed to be adsorption of the impurities on the aluminum hydroxide, although the present invention is not to be limited to any particular mechanism. The pH of the liquor in this step of the invention should accordingly be adjusted to minimize the solubility of aluminum hydroxide in the sodium tungstate liquor being treated. In this regard, a pH of about 6 to about 8, and more advantageously about 7 to about 8, should be provided. The amount of aluminum compound to be added to the liquor can vary with the impurity content of the liquor, but should be selected to maximize fluorine removal from the liquor. An amount of an aluminum compound equivalent to about 0.1 gpl to about 3.0 gpl of aluminum ion, and more advantageously about 0.2 gpl to about 1.2 gpl of aluminum ion, is generally effective.

The liquor should be filtered again before being passed to subsequent processing stages. Substantially all the aluminum which is added to the liquor in this step precipitates out of solution and is removed from the liquor by filtration. This is an advantageous feature of the present invention, since aluminum ion that remains in solution would otherwise report to the final tungsten product and would reduce the purity thereof.

The additions of magnesium and aluminum in accordance with this invention should be effective to reduce the dissolved silica content of the sodium tungstate leach liquor to less than about 10 ppm; the dissolved phosphorus content of the liquor to less than about 5 ppm (as $PO_4^{-3}$); and the dissolved fluorine content of the liquor to less than about 200 ppm (as $F^-$). Advantageously, to reduce further the deleterious effect of these impurities on the subsequent liquor processing stages and on the purity of the final product, the dissolved silica content is reduced to less than about 5 ppm, the dissolved phosphorus content is reduced to less than about 1 ppm, and the dissolved fluorine content is reduced to less than about 100 ppm.

A significant, unexpected advantage of the process of the present invention is that silica, phosphorus, and fluorine dissolved in the leach liquor are removed from solution in a surprisingly short period of time. This feature makes possible improved rates of production and operating efficiency. Maximum removal of silica, phosphorus and fluorine from the leach liquor in the process of the present invention can be effectively achieved by holding the liquor for about 1 to about 3 hours, and advantageously about 1 to about 2 hours, following addition of the magnesium salt before filtering the solids from the liquor. A further holding time of about 1 to about 3 hours, and advantageously about 1 to about 2 hours, following addition of the aluminum salt is effective to maximize removal of impurities from the liquor.

Besides the rate of removal of silica, phosphorus and fluorine, the fact that all three of these impurities can be substantially removed is itself surprising; as will be seen in the Examples below, treatment of sodium tungstate leach liquor with magnesium salt alone or with aluminum salt alone is relatively ineffective to ultimately remove all three of the impurities in question (silica, phosphorus and fluorine) from the liquor, even given a far greater amount of time than the present invention uses.

The invention will be further described in the following non-limiting Examples.

EXAMPLE 1

An aqueous sodium tungstate leach liquor produced by soda ash digestion of scheelite ($CaWO_4$) ore concentrate and having dissolved therein 500 ppm of $SiO_2$, 120 ppm P and 2000 ppm F was brought to a temperature of 60° C. and its pH was adjusted to 10.5. Sufficient magnesium sulfate to provide 1 gpl of $Mg^{+2}$ ion was stirred into the liquor. After 2 hours, the liquor contained dissolved therein 10 ppm $SiO_2$, 10 ppm P, and 1000 ppm F. A precipitate which had formed in the liquor was filtered off. The filtered liquor was then brought to a temperature of 25° C. and sulfuric acid was added to adjust the pH to 8.0. Sufficient aluminum sulfate to provide 0.2 gpl of $Al^{+3}$ ion was then stirred into the liquor, and a precipitate formed. After 2 hours the liquor contained dissolved therein 10 ppm $SiO_2$, 2 ppm P, and 100 ppm F.

EXAMPLE 2

Another aqueous sodium tungstate leach liquor produced by soda ash digestion of scheelite ($CaWO_4$) ore concentrate and having dissolved therein 500 ppm $SiO_2$, 120 ppm P and 2000 ppm F was brought to a temperature of 60° C. and its pH was adjusted to 10.5. Sufficient magnesium sulfate to provide 1 gpl $Mg^{+2}$ was stirred into the liquor. After 2 hours, the liquor contained dissolved therein 10 ppm $SiO_2$, 12 ppm P, and 1100 ppm F. A precipitate which had formed in the liquor was filtered off. The filtered liquor was then brought to a temperature of 25° C. and sulfuric acid was added to adjust the pH to 8.0. Sufficient aluminum sulfate to provide 1 gpl of $Al^{+3}$ ion was then stirred into the liquor, and a precipitate formed. After 2 hours, the liquor contained dissolved therein 10 ppm $SiO_2$, 3 ppm P, and 60 ppm F.

EXAMPLE 3

To demonstrate the unexpected overall effect of the present invention, two test runs were made to examine the effect on dissolved silica, phosphorus and fluorine of adding magnesium but not aluminum (Run A), and aluminum but not magnesium (Run B):

Run A

Sodium tungstate leach liquor having initial impurity concentrations of 500 ppm $SiO_2$, 120 ppm P, and 2000 ppm F was brought to 60° C. and was adjusted to a pH of 10.6. Sufficient magnesium sulfate to provide 1 gpl of $Mg^{+2}$ ion was stirred into the liquor. After 23 hours, the leach liquor still contained dissolved therein 8 ppm $SiO_2$, 12 ppm P, and 600 ppm F.

Run B

Sodium tungstate leach liquor having initial impurity concentrations of 500 ppm $SiO_2$, 120 ppm P, and 2000 ppm F was brought to 25° C. and was adjusted with sulfuric acid to a pH of 8. Sufficient aluminum sulfate to provide 1.2 gpl of $Al^{+3}$ ion was stirred into the liquor. After 23 hours, the liquor contained dissolved therein 370 ppm $SiO_2$, 100 ppm P, and 110 ppm F.

Comparison of Examples 2 and 3 indicates that the process of the present invention is capable of rejecting substantial quantities of dissolved silica, phosphorus and fluorine from basic sodium tungstate leach liquor, and of doing so in significantly less time compared to what one might expect from considering additions of only magnesium or only aluminum.

What is claimed is:

1. A process for treating a filtered basic sodium tungstate leach liquor which contains dissolved therein about 20 ppm to about 10,000 ppm of silica, about 10 ppm to about 120 ppm of phosphorus, and about 500 ppm to about 4,000 ppm of fluorine, to reduce the concentration of silica, phosphorus and fluorine impurities dissolved therein, comprising providing a source of magnesium in the liquor for removal of silica and phosphorus from solution in the liquor, while maintaining the liquor temperature between about 60° C. and about 100° C. and the liquor pH between about 9 and about 11, filtering the liquor, adjusting the liquor pH to between about 6 and about 8 and the liquor temperature to between about 20° C. and about 60° C., and then providing aluminum hydroxide in the filtered liquor for removal of fluorine from solution in the liquor while maintaining the liquor temperature between about 20° C. and about 60° C. and the liquor pH between about 6 and about 8, whereby the magnesium and the aluminum hydroxide lower the silica concentration to below about 10 ppm, the phosphorus concentration to below about 5 ppm, and the fluorine concentration to below about 200 ppm.

2. A process for treating a basic sodium tungstate leach liquor which contains dissolved therein about 20 ppm to about 10,000 ppm of silica, about 10 ppm to about 120 ppm of phosphorus, and about 500 ppm to about 4,000 ppm of fluorine, and which is slurried with unreacted leach solids and gangue, to reduce the concentration of silica, phosphorus and fluorine impurities dissolved therein, comprising providing a source of magnesium in the slurry for removal of silica and phosphorus from solution in the liquor, while maintaining the liquor temperature between about 60° C. and about 100° C. and the liquor pH between about 9 and about 11, filtering the liquor from the slurry, adjusting the liquor pH to between about 6 and about 8 and the liquor temperature to between about 20° C. and about 60° C., and then providing aluminum hydroxide in the liquor for removal of fluorine from solution in the liquor while maintaining the liquor temperature between about 20° C. and about 8, whereby the magnesium and the aluminum hydroxide lower the silica concentration to below about 10 ppm, the phosphorus concentration to below about 5 ppm, and the fluorine concentration to below about 200 ppm.

3. The process of claim 1 or claim 2 wherein the dissolved silica content of the leach liquor is reduced to less than about 5 ppm, the dissolved phosphorus content of the leach liquor is reduced to less than about 1 ppm, and the dissolved fluorine content of the leach liquor is reduced to less than about 100 ppm.

4. The process of claim 1 or claim 2 wherein the amount of magnesium provided to the leach liquor corresponds to about 0.1 gpl to about 3.0 gpl of magnesium ion, and the amount of aluminum hydroxide provided in the leach liquor corresponds to about 0.1 gpl to about 3.0 gpl of aluminum ion.

5. The process of claim 1 or claim 2 wherein the amount of magnesium provided to the leach liquor corresponds to about 0.5 gpl to about 2.0 gpl of magnesium ion, and the amount of aluminum hydroxide provided in the leach liquor corresponds to about 0.2 gpl to about 1.2 gpl of aluminum ion.

6. The process of claim 1 or claim 2 wherein the pH of the liquor is maintained at about 10 to about 11 while the magnesium is provided to the liquor, and the pH of the liquor is adjusted to about 7 to about 8 before providing aluminum hydroxide to the liquor and is maintained at about 7 to about 8 while fluorine is removed from solution in the liquor.

7. A process for treating a filtered basic sodium tungstate leach liquor to reduce the concentration of silica, phosphorus and fluorine impurities dissolved therein, comprising providing a source of magnesium in the liquor in an amount corresponding to about 0.1 gpl to about 3.0 gpl of magnesium ion, while maintaining the liquor temperature between about 60° C. and about 100° C. and the liquor pH between about 9 and about 11, filtering the liquor, adjusting the liquor pH to between about 6 and about 8 and the liquor temperature to between about 20° C. and about 60° C., and then providing an amount of aluminum hydroxide in the filtered liquor corresponding to about 0.1 gpl to about 3.0 gpl of aluminum ion while maintaining the liquor temperature between 20° C. and about 60° C. and the liquor pH between about 6 and about 8.

8. A process for treating a basic sodium tungstate leach liquor slurried with unreacted leach solids and gangue to reduce the concentration of silica, phosphorus and fluorine impurities dissolved therein, comprising providing a source of magnesium in the slurry in an amount corresponding to about 0.1 gpl to about 3.0 gpl of magnesium ion while maintaining the liquor temperature between about 60° C. and about 100° C. and the liquor pH between about 9 and about 11, filtering the liquor from the slurry, adjusting the liquor pH to between about 6 and about 8 and the liquor temperature to between about 20° C. and about 60° C., and then providing an amount of aluminum hydroxide in the liquor corresponding to about 0.1 gpl to about 3.0 gpl of aluminum ion while maintaining the liquor temperature between about 20° C. and about 60° C. and the liquor pH between about 6 and about 8.

* * * * *